(12) United States Patent
Klein et al.

(10) Patent No.: US 9,878,686 B2
(45) Date of Patent: Jan. 30, 2018

(54) APPARATUS FOR OPERATING A GAS GENERATOR FOR A SAFETY DEVICE FOR A VEHICLE

(71) Applicant: Robert Bosch GmbH, Stuttgart (DE)

(72) Inventors: Martin Klein, Lauffen am Neckar (DE); Volker Weeber, Lauffen A. N. (DE); Klaus Heyer, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 287 days.

(21) Appl. No.: 14/885,753

(22) Filed: Oct. 16, 2015

(65) Prior Publication Data

US 2016/0107605 A1  Apr. 21, 2016

(30) Foreign Application Priority Data

Oct. 20, 2014  (DE) .................. 10 2014 221 205

(51) Int. Cl.
*B60R 21/26* (2011.01)
*B60R 21/264* (2006.01)
*B60R 21/017* (2006.01)

(52) U.S. Cl.
CPC .......... *B60R 21/264* (2013.01); *B60R 21/017* (2013.01); *B60R 2021/26029* (2013.01)

(58) Field of Classification Search
CPC ............... B60R 21/264; B60R 21/017; B60R 2021/26029
See application file for complete search history.

(56) References Cited

U.S. PATENT DOCUMENTS

| | | | | |
|---|---|---|---|---|
| 5,898,122 A * | 4/1999 | Davis | ................... | B60R 21/017 102/202.5 |
| 5,927,753 A * | 7/1999 | Faigle | ................... | B60R 21/268 280/735 |
| 5,929,535 A * | 7/1999 | Fendt | ................... | B60R 21/017 180/268 |
| 6,076,852 A * | 6/2000 | Faigle | ................... | B60R 21/26 280/735 |
| 2004/0083919 A1* | 5/2004 | Hosey | ................... | F42B 3/121 102/202.12 |
| 2014/0144344 A1* | 5/2014 | Brisighella, Jr. | ........ | C06D 5/00 102/530 |

* cited by examiner

*Primary Examiner* — Scott Bauer
(74) *Attorney, Agent, or Firm* — Norton Rose Fulbright US LLP; Gerard Messina

(57) ABSTRACT

An apparatus for operating a gas generator for a safety device for a vehicle includes: a first terminal and a second terminal for furnishing a triggering voltage for triggering the safety device; a firing device configured to fire in response to a firing current, in order to open a closure element; an electrical coil configured to actuate, in response to a coil current, a closure device for controlling a gas flow through the outlet opening, the coil being connected in series with the firing device between the first terminal and the second terminal; and an electrical component having a voltage-dependent resistance and connected in parallel with the firing device.

12 Claims, 2 Drawing Sheets

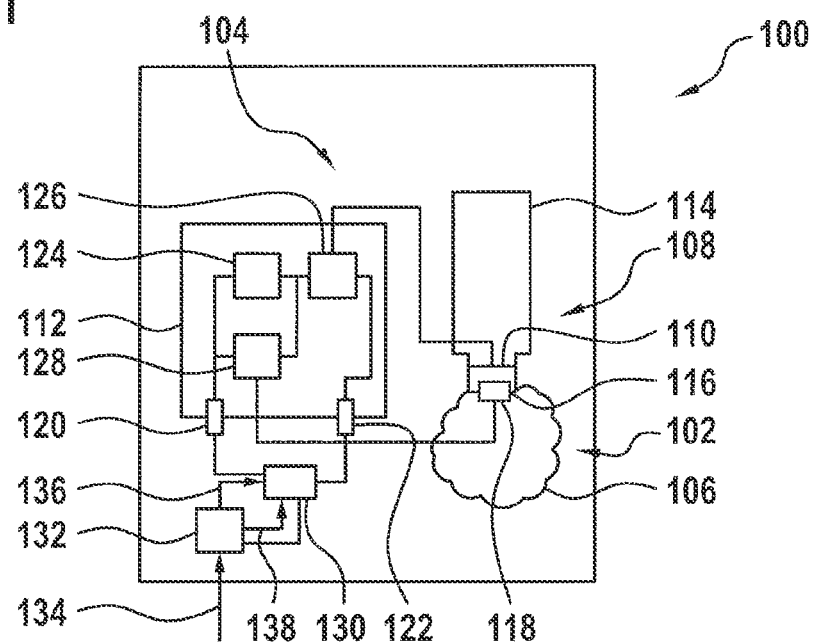
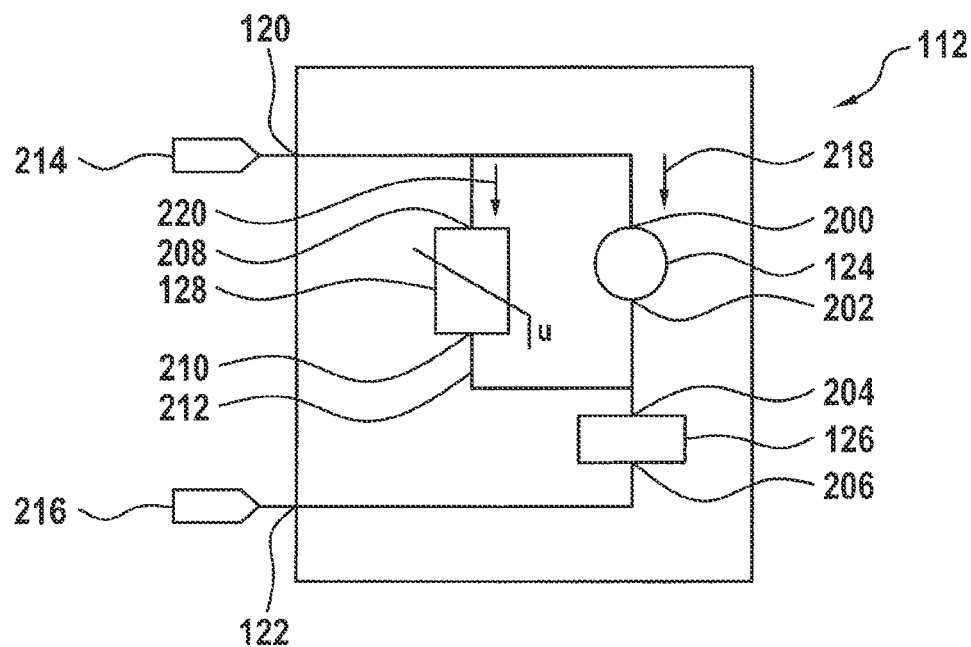

APPARATUS FOR OPERATING A GAS GENERATOR FOR A SAFETY DEVICE FOR A VEHICLE

BACKGROUND OF THE INVENTION

1. Field of the Invention

The present invention relates to an apparatus for operating a gas generator for a safety device for a vehicle, to a method for controlling an apparatus of this kind and to a corresponding computer program, to a safety apparatus for a vehicle, and to a control unit for furnishing a firing voltage and an actuation voltage.

2. Description of the Related Art

Gas generators are often used in safety devices for vehicles, for example in order to furnish a gas for an airbag of a vehicle in the event of a collision. For reasons of adaptive capability, the gas generator can be combined with a valve by which the gas mass flow into, for example, an airbag sack can be controlled. Usually a pyrotechnic charge is fired with an ignition means in order to activate the gas generator. Control is applied to the valve by current flow through a solenoid coil. The gas generators are often embodied as cold-gas generators.

BRIEF SUMMARY OF THE INVENTION

In light of the above, using the approach presented here an apparatus for operating a gas generator for a safety device for a vehicle, a method for controlling an apparatus for operating a gas generator for a safety device for a vehicle, a control unit that uses said method, a corresponding computer program, and lastly a safety apparatus for a vehicle are presented.

An outlet opening of a container of a gas generator can be closed off by a closure element and additionally by a closure device. The closure element can be permanently opened using a firing device. The closure device can be embodied in reclosable fashion, so that the container can be reclosed even after the closure element is opened. The closure device can be, for example, a valve. In order to operate the gas generator, i.e. in order to release gas from the container of the gas generator, it is thus necessary for both the closure element and the closure device to be opened in order to enable the release of gas from the container. The closure device can be actuated using a coil.

The closure device can be embodied so that a defined baseline throughput of gas flows out after opening of the closure element, and so that said throughput can be modified between a minimum value and a maximum value by actuation of the closure device.

Thanks to suitable enhancement of an electrical circuit of an apparatus for operating a gas generator to include a component having a voltage-dependent resistance, the electrical circuit can require only two connecting leads both for application of control to the firing device and for application of control to the coil. The circuit can be used in general in interaction with a firing device in the form of a pyrotechnic igniter and a solenoid valve.

Advantageously, an outflow of gas from the container of the gas generator can be controlled by the closure device. As a result, for example, a fill volume or a time progression of an inflation of an airbag that is filled using the gas generator can be controlled. Adaptation of a safety device, for example of an airbag, is thus possible with no need for a multi-stage construction of multiple gas generators in order to adapt the fill volume. It is thus possible, for the purpose of adaptation when a gas generator is used, to implement a separation of a function for opening the closure element (for example, a membrane opening function) from a function of flowthrough control by way of the closure device; the two functions can be activated in shared fashion using only two connecting leads.

The gas generator can be embodied, for example, as a pyrotechnic gas generator, as a hybrid gas generator, or as a cold-gas generator.

An apparatus for operating a gas generator for a safety device for a vehicle is presented, the gas generator having a container for storing gas and the container having an outlet opening, closed off by a closure element, for the gas; and the apparatus having the following features:

a first terminal and a second terminal for furnishing a triggering voltage for triggering the safety device;

a firing device that is embodied to fire in response to a firing current, in order to open the closure element;

an electrical coil that is embodied to actuate, in response to a coil current, a closure device for controlling a gas flow through the outlet opening, the coil being connected in series with the firing device between the first terminal and the second terminal; and an electrical component having a voltage-dependent resistance, the electrical component being connected in parallel with the firing device.

The vehicle can be, for example, a road vehicle such as a passenger car, a commercial vehicle, or a motorcycle. A "safety device" can be understood as a device of the vehicle which is embodied to protect the occupant(s), the vehicle, or other traffic participants from harm in the event of a collision involving the vehicle. This includes, for example, a roll bar, an active engine hood, an active vehicle seat, a device for tensioning a seatbelt, or an airbag. The safety device can provide its protective effect by being activated by gas flowing out of the container of the gas generator. Because the outlet opening of the container is closed off by the closure element, the pressurized gas can be permanently stored in the container until the closure element is opened. Opening of the closure element can be irreversible.

The apparatus can have an electrical circuit that electrically conductively interconnects the first terminal, the second terminal, the firing device, an electrical coil, and the electrical component having a voltage-dependent resistance, for example by way of electrical leads or conductor paths.

The first terminal and the second terminal can represent terminal segments of the electrical circuit. The first and the second terminal can be coupled or couplable to output stages of the electrical circuit. The electrical circuit can be connected via the first and the second terminal to a voltage supply device. "Connected" can be understood to mean electrically conductively connected. For example, the first terminal can be embodied to furnish a first operating voltage potential and the second terminal can be embodied to furnish a second operating voltage potential. The triggering voltage can be furnished in response to a triggering signal indicating a collision involving the vehicle.

The "firing device" can be understood, for example, as a bridgewire detonator or a firing pellet. The ignition device can have a wire that is heated by the firing current. Heating of the wire can ignite a combustible material, with the result that further heat or energy for opening the closure element can be furnished.

The closure device can represent an inductive actuator, for example in the form of a solenoid valve. The electrical coil can be part of the closure device. The electrical coil can be embodied to actuate the closure device, in response to the coil current flowing through the coil, in such a way that the closure device opens the outlet opening of the container. The current induced by the coil can furthermore be passed through the firing device and can be used as a firing current for the firing device.

According to an embodiment of the apparatus, the electrical component can be embodied to close a bypass lead as a function of a voltage applied to the electrical component, in order to bypass the firing device. The apparatus can thus advantageously be operated with a first operating voltage in order to fire the firing device, and with a second operating voltage in order to apply control to the electrical coil.

The electrical component can represent, for example, a varistor. A varistor offers the advantage that its very high resistance in normal operation can become very low, with almost no delay, in a context of overvoltage.

Alternatively, the electrical component can represent a Zener diode or Z-diode. The voltage-dependent bypass lead can thereby be implemented particularly economically.

According to a further embodiment of the apparatus, a first firing contact of the firing device can be electrically conductively connected to the first terminal and to a first component contact of the electrical component, and a second firing contact of the firing device can be electrically conductively connected to a first coil contact of the electrical coil and to a second component contact of the electrical component. A second coil contact of the electrical coil can be electrically conductively connected to the second terminal. This circuit configuration makes possible the parallel circuit of the firing device and electrical component, simultaneously with a series circuit of the firing device and electrical coil, which are suitable for implementing the circuit principle presented here.

A safety apparatus for a vehicle is also presented, the safety apparatus having the following features:
  a gas generator having a container for storing gas, the container having an outlet opening, closed off by a closure element, for the gas;
  a closure device for controlling a gas flow through the outlet opening of the container; and
  an apparatus according to one of the embodiments set forth above for operating the gas generator, the coil of the apparatus being embodied to actuate the closure device.

The approach according to the present invention can thus advantageously be used in conjunction with a gas generator in order to activate a safety device, for example of a vehicle.

A method for controlling an apparatus for operating a gas generator for a safety device for a vehicle is also presented, the gas generator having a container for storing gas and the container having an outlet opening, closed off by a closure element, for the gas, and the apparatus having a first terminal and a second terminal for furnishing a triggering voltage for triggering the safety device; a firing device that is embodied to fire in response to a firing current, in order to open the closure element; an electrical coil that is embodied to actuate, in response to a coil current, a closure device for controlling a gas flow through the outlet opening, the coil being connected in series with the firing device between the first terminal and the second terminal; and an electrical component having a voltage-dependent resistance, the electrical component being connected in parallel with the firing device; and the method having the following steps:
  furnishing a firing voltage until the firing device has fired; and
  furnishing an actuation voltage in order to actuate the closure device.

According to an embodiment of the method, identical electrical voltages can be furnished in the step of furnishing a firing voltage and in the step of furnishing an actuation voltage. This embodiment makes it possible to apply control particularly quickly and easily to both the firing device and the closure device.

Alternatively, different electrical voltages can be furnished in the step of furnishing a firing voltage and in the step of furnishing an actuation voltage. The firing device and the closure device can thus advantageously be actuated in targeted and time-controlled fashion.

A control unit is also presented. The control unit can be embodied to furnish a firing signal for application of a firing voltage to a firing device of an apparatus according to the one of the embodiments explained above, in order to fire the firing device. The control unit can furthermore be embodied to furnish an actuation signal for application of an actuation voltage to a closure device of a safety apparatus explained above, in order to actuate the closure device.

The ignition signal and the actuation signal can be electrical signals. The control unit can be embodied to carry out, control, or implement the steps of a variant of the method presented here in corresponding devices. The underlying object of the invention can also be quickly and efficiently achieved by this variant embodiment of the invention in the form of a control unit.

A "control unit" can be understood in the present case as an electrical unit that processes sensor signals and, as a function thereof, outputs control signals and/or data signals. The control unit can have an interface that can be embodied on a hardware basis and/or on a software basis. In a hardware-based embodiment, for example, the interfaces can be part of a so-called "system ASIC" that contains a wide variety of functions of the control unit. It is also possible, however, for the interfaces to be separate integrated circuits or to be made up at least in part of discrete components. In a software-based embodiment, the interfaces can be software modules that are present, for example, on a microcontroller alongside other software modules.

Also advantageous is a computer program product having program code, which can be stored on a machine-readable medium or storage medium such as a semiconductor memory, a hard drive memory, or an optical memory, and can be used to carry out, implement, and/or control the steps of the method in accordance with one of the embodiments described above, in particular when the program product or program is executed on a computer or on an apparatus.

BRIEF DSECRIPTION OF THE DRAWINGS

FIG. 1 schematically depicts a vehicle having a safety system according to an exemplifying embodiment of the present invention.

FIG. 2 is a circuit diagram of an apparatus for operating a gas generator, according to an exemplifying embodiment of the present invention.

DETAILED DESCRIPTION OF THE INVENTION

Figure 3:
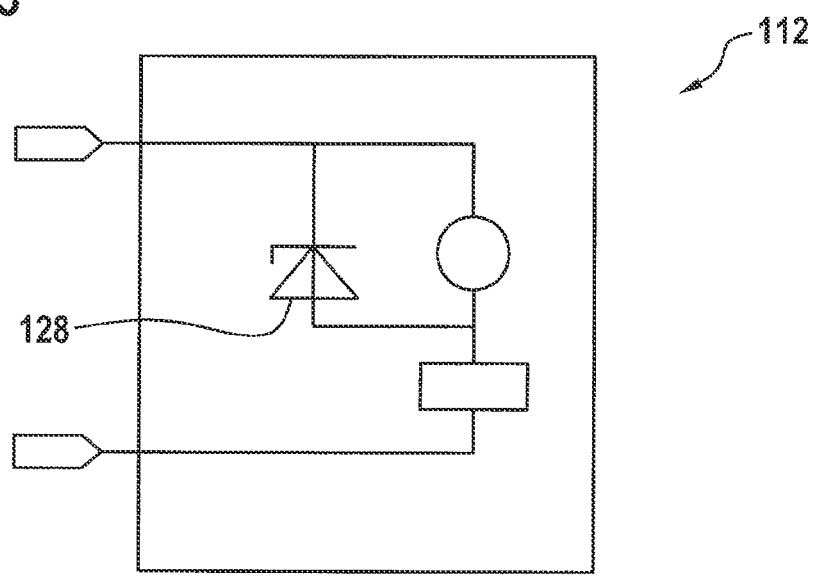
FIG. 3 is a circuit diagram of an apparatus for operating a gas generator, according to a further exemplifying embodiment of the present invention.

In the description below of favorable exemplifying embodiments of the present invention, identical or similar reference characters are used for the elements that are depicted in the various Figures and operate similarly, repeated description of said elements being omitted.

FIG. 1 schematically depicts a vehicle 100 having a safety system according to an embodiment of the present invention. The safety system has a safety device 102 and a safety apparatus 104. In the exemplifying embodiment shown in FIG. 1, safety device 102 is an airbag of vehicle 100, which in the depiction of FIG. 1 is represented by an air sack 106 of airbag 102.

Safety apparatus 104 encompasses a gas generator 108, a closure device 110, and an apparatus 112 for operating gas generator 108. Gas generator 108 has a container 114 in which, when gas generator 108 is in the operationally ready state, a pressurized gas (here a cold gas), for filling air sack 106 of airbag 102 with the gas in the event of a collision involving vehicle 100, is stored. Container 114 has for this purpose an outlet opening 116, coupled to air sack 106, for the gas. Another suitable gas generator embodiment, for example in the form of a pyrotechnic gas generator or hybrid gas generator, can also be used instead of the cold-gas generator described here.

With the safety system in an idle state, outlet opening 116 of container 114 is closed off in gas-tight fashion by a closure element 118 and by closure device 110. Closure element 118 is, for example, a membrane or disk. Closure device 110 is, for example, a solenoid valve. Closure element 118 and closure device 110 are to open in order to operate gas generator 108. Closure element 118 is designed so that it remains permanently open after opening. Closure device 110 is embodied to control a gas flow through outlet opening 116 of container 114 into air sack 106, and designed so that it can be reclosed after opening.

Apparatus 112 for operating gas generator 108 is embodied to enable a gas flow through outlet opening 116 of container 114 from container 114 into airbag 102. According to the exemplifying embodiment shown in FIG. 1, apparatus 112 is embodied to adapt the gas flow, for example to control a total volume of outflowing gas or a time progression of the outflow of gas. The safety system can thereby be designed adaptively. For example, apparatus 112 can be embodied to actuate gas generator 108 in response to a collision involving vehicle 100, and then to control a progression of the outflow of gas as a function of a nature or progression of the collision.

According to the exemplifying embodiment shown in FIG. 1, apparatus 112 encompasses a first terminal 120 and a second terminal 122, a firing device 124, an electrical coil 126, and an electrical component 128 having a voltage-dependent resistance. A triggering voltage for triggering safety device 102 is furnished via first terminal 120 and second terminal 122. First terminal 120 and second terminal 122 are electrically conductively connected for that purpose to a voltage source 130 of vehicle 100. Firing device 124, electrical coil 126, and electrical component 128 are connected between first terminal 120 and second terminal 122, electrical component 128 being connected in parallel with firing device 124, and electrical coil 126 being connected in series with firing device 124.

Firing device 124 is associated with closure element 118 and is embodied to fire in response to a firing current, in order to open closure element 118. Firing device 124 can have for that purpose an ignition means, for example one or more firing pellets. In a deviation from what is schematically depicted in FIG. 1, firing device 124 can be disposed in the vicinity of, for example directly adjacently to, closure element 118, or can also be integrated into closure element 118.

Electrical coil 126 is coupled to closure device 110 or is part of closure device 110, in order to actuate closure device 110 or a closing part of closure device 110 in response to a coil current. When sufficient current flows through electrical coil 126, closure device 110 opens outlet opening 116 of container 114. When the current flow through electrical coil 126 ends, outlet opening 116 is reclosed by closure device 110, for example driven by a return spring. Depending on the embodiment, closure can be effected down to a gas flow rate of zero, i.e. no gas flow, or to a baseline flow rate. In a deviation from what is schematically depicted in FIG. 1, electrical coil 126 can be disposed in the vicinity of, for example directly adjacently to, closure device 110, or can also be integrated into closure device 110.

The safety system shown by way of example in FIG. 1 also possesses a central control unit 132, for example an airbag control unit of vehicle 100. Control unit 132 is coupled to voltage source 130 and is embodied to furnish a firing signal 136 and an actuation signal 138 to voltage source 130, in response to a signal 134 that, for example, indicates that a collision involving vehicle 100 has occurred. Voltage source 130 is embodied to apply, in response to firing signal 136, a firing voltage between terminals 120, 122 in order to fire the firing device 124, and to apply, in response to actuation signal 138, an actuation voltage between terminals 120, 122 in order to actuate closure device 110.

Depending on the physical embodiment of apparatus 112 for operating gas generator 108, elements of apparatus 112 which have been described can also be implemented as part of gas generator 108 or of control unit 132.

FIG. 2 shows an example of a wiring diagram of an exemplifying embodiment of apparatus 112 for operating the gas generator of FIG. 1. As the circuit diagram shows, a first firing contact 200 of firing device 124 is electrically conductively connected to first terminal 120. A second firing contact 202 of firing device 124 is electrically conductively connected to a first coil contact 204 of electrical coil 126. A second coil contact 206 of electrical coil 126 is electrically conductively connected to second terminal 122. In addition, first firing contact 200 is electrically conductively connected to a first component contact 208 of electrical component 128, and second firing contact 202 is electrically conductively connected to a second component contact 210 of electrical component 128.

It is clearly evident from the circuit diagram of FIG. 2 that electrical component 128 is connected in parallel with firing device 124, and that electrical coil 126 is connected in series respectively with firing device 124 and with electrical component 128. With the parallel connection of firing device 124 and electrical component 128, that arm of the circuit shown in FIG. 2 which has electrical component 128 constitutes a bypass lead 212 in order to bypass firing device 124. In the exemplifying embodiment shown in FIG. 2, electrical component 128 having a voltage-dependent resistance is a varistor.

In order to operate the gas generator (not shown here) coupled to apparatus 112, first terminal 120 is electrically conductively connected to a first output stage 214 in order to furnish a first operating voltage potential (here, for example, an operating voltage). Second terminal 122 is electrically conductively connected to a second output stage 216 in order to furnish a second operating voltage potential (here, for example, ground).

When the first and the second operating voltage potential are applied via output stages 214, 216 to terminals 120, 122, then as a result of the voltage difference between terminals 120, 122 a firing current 218 is generated through firing device 124, and a coil current 220 is generated through electrical coil 126. Firing current 218 and coil current 220 can respectively be applied to terminals 120, 122, in response to a respective firing signal and actuation signal of a control device associated with apparatus 112, via a voltage source associated with apparatus 112.

Upon activation of the vehicle safety device coupled to apparatus 112, a resistance of bypass lead 212, having electrical component 128, of the circuit that is shown is many times higher than a resistance of firing device 124. Firing current 218 is correspondingly directed at least predominantly through that arm of the circuit which has firing device 124. In response to firing current 218, the ignition means fires firing device 124 and firing device 124 opens the closure element of the container of the gas generator, so that a first gas mass flow can flow out of the container into the attached safety device.

According to an exemplifying embodiment of apparatus 112, as the ignition means burns out, firing device 124 becomes high-impedance. Coil current 220 thus flows, through bypass lead 212 having electrical component 128 having a voltage-dependent resistance, to electrical coil 126. In response to coil current 220 through electrical coil 126, the closure device coupled to electrical coil 126 becomes actuated in order to control the gas mass flow out of the container into the attached safety device.

According to an exemplifying embodiment, in order to activate a gas generator coupled to apparatus 112 a current is impressed via a channel of airbag control unit output stage 214, 216 onto the circuit shown in FIG. 2. The parallel circuit of ignition means or firing device 124 and component 128 having a voltage-dependent resistance firstly causes the current to flow for the most part not via the high-impedance varistor 128 but instead via ignition means 124, activating the latter.

Solenoid coil 126 located in series with the parallel circuit is at first low-impedance and represents only a low ohmic resistance. A sufficiently high current can thus flow through ignition means 124 in order for it to be activated. When ignition means 124 has burned out, it can become inert and thus high-impedance. The consequence of this is that the voltage-dependent resistor 128 becomes low-impedance, and sufficient current can thus flow through coil 126 of the solenoid in order for it to switch. When ignition means 124 becomes low-impedance after it is activated, varistor 128 remains high-impedance, and solenoid current or coil current 220 then flows through ignition means 124.

The circuit shown in FIG. 2 can be used in various embodiments for an airbag 102 having a gas generator 108. The number of firing circuit leads or firing circuit terminals 120, 122 can be reduced from four or more leads, for example, to no more than two leads 120, 122.

FIG. 3 is an example of a circuit diagram of a further exemplifying embodiment of apparatus 112 for operating the gas generator of FIG. 1. The circuit configuration of the exemplifying embodiment shown in FIG. 3 corresponds to the circuit shown in FIG. 2 for supplying power to the ignition means and gas generator valve via a two-wire lead, with the difference that instead of the varistor of FIG. 2, a Zener diode or Z-diode is used as electrical component 128 having a voltage-dependent resistance.

Figure 4:
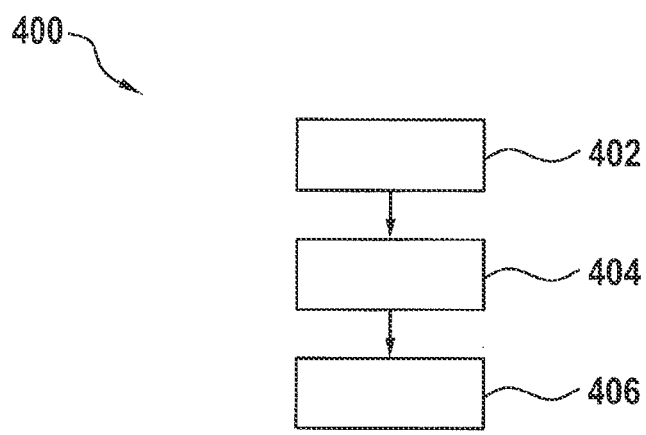
FIG. 4 is a flow chart of a method for operating a gas generator for a safety device, according to an exemplifying embodiment of the present invention.

FIG. 4 is a flow chart of an exemplifying embodiment of a method 400 for operating a gas generator for a safety device. Method 400 can be used in conjunction with the safety system shown in FIG. 1.

In a step 402, two terminals of a parallel and series circuit made up of a firing device, a coil, and an electrical component, as shown by way of example in FIGS. 1 to 3, are connected between a first operating voltage potential and a second operating voltage potential. A flow of current between the terminals is thereby generated.

With the furnishing of the current flow between the terminals, in a step 404 a firing voltage is furnished between the terminals until the firing device, associated with a closure element of a gas container of the gas generator, fires, with the result that the closure element is destroyed and the gas container is opened for a first gas mass flow out of the container into the safety device of the safety system.

In a step 406, with the furnishing of the current flow between the terminals an actuation voltage between the terminals is furnished in order to actuate a closure device actuatable by the coil. A further gas mass flow out of the container into the safety device of the safety system is suitably controlled by way of the actuation of the closure device.

According to an exemplifying embodiment of method 400, identical electrical voltages can be furnished in step 404 of furnishing the firing voltage and in step 406 of furnishing the actuation voltage.

Alternatively, different electrical voltages can be furnished in step 404 of furnishing the ignition voltage and in step 406 of furnishing the actuation voltage.

The exemplifying embodiments that are described and shown in the Figures are selected merely by way of example. Different exemplifying embodiments can be combined with one another entirely or with respect to individual features. An exemplifying embodiment can also be supplemented with features of a further exemplifying embodiment. The method steps presented here can furthermore be executed repeatedly, and in a sequence other than the one described here.

When an exemplifying embodiment encompasses an "and/or" relationship between a first feature and second feature, this is to be construed to mean that the exemplifying embodiment according to one embodiment has both the first feature and the second feature, and according to a further embodiment has either only the first feature or only the second feature.

What is claimed is:

1. An apparatus for operating a gas generator for a safety device for a vehicle, the gas generator having a container for storing gas, and the container having an outlet opening for the gas, which outlet opening is selectively closed off by a closure element, the apparatus comprising:
    a first terminal and a second terminal for providing a triggering voltage for triggering the safety device;
    a firing device configured to fire in response to a firing current, in order to open the closure element;
    an electrical coil configured to actuate, in response to a coil current, a closure device for controlling a gas flow through the outlet opening, the coil being connected in series with the firing device between the first terminal and the second terminal; and
    an electrical component having a voltage-dependent resistance and being connected in parallel with the firing device.

2. The apparatus as recited in claim 1, wherein the electrical component is configured to selectively close a bypass lead as a function of a voltage applied to the electrical component, in order to bypass the firing device.

3. The apparatus as recited in claim 2, wherein the electrical component is a varistor.

4. The apparatus as recited in claim 2, wherein the electrical component is a Zener diode.

5. The apparatus as recited in claim 2, wherein:
- a first firing contact of the firing device is electrically conductively connected to the first terminal and to a first component contact of the electrical component;
- a second firing contact of the firing device is electrically conductively connected to a first coil contact of the electrical coil and to a second component contact of the electrical component; and
- a second coil contact of the electrical coil is electrically conductively connected to the second terminal.

6. The apparatus as recited in claim 1, further comprising:
- a control unit for providing a firing signal for application of a firing voltage to the firing device in order to fire the firing device.

7. A safety apparatus for a vehicle, the safety apparatus comprising:
- a gas generator having a container for storing gas, the container having an outlet opening for the gas, said outlet opening being selectively closed off by a closure element;
- a closure device for controlling a gas flow through the outlet opening of the container; and
- an apparatus for operating the gas generator, the apparatus including:
    - a first terminal and a second terminal for providing a triggering voltage for triggering the safety device;
    - a firing device configured to fire in response to a firing current, in order to open the closure element;
    - an electrical coil configured to actuate, in response to a coil current, the closure device for controlling the gas flow through the outlet opening, the coil being connected in series with the firing device between the first terminal and the second terminal; and
    - an electrical component having a voltage-dependent resistance and being connected in parallel with the firing device.

8. The apparatus as recited in claim 7, further comprising:
- a control unit for providing an actuation signal for application of an actuation voltage to the closure device in order to actuate the closure device.

9. A method for operating a gas generator for a safety device for a vehicle, the gas generator having a container for storing gas, and the container having an outlet opening for the gas, which outlet opening is selectively closed off by a closure element, and the apparatus having (i) a first terminal and a second terminal for providing a triggering voltage for triggering the safety device, (ii) a firing device configured to fire in response to a firing current, in order to open the closure element, (iii) an electrical coil configured to actuate, in response to a coil current, the closure device for controlling the gas flow through the outlet opening, the coil being connected in series with the firing device between the first terminal and the second terminal, and (iv) an electrical component having a voltage-dependent resistance and being connected in parallel with the firing device, the method comprising:
- providing the triggering voltage until the firing device has fired; and
- providing an actuation voltage in order to actuate the closure device.

10. The method as recited in claim 9, wherein identical electrical voltages are provided in the step of providing the firing voltage and in the step of providing the actuation voltage.

11. The method as recited in claim 9, wherein different electrical voltages are provided in the step of providing the firing voltage and in the step of providing the actuation voltage.

12. A non-transitory, machine-readable data storage medium storing a computer program having program codes which, when executed on a computer, perform a method for operating a gas generator for a safety device for a vehicle, the gas generator having a container for storing gas, and the container having an outlet opening for the gas, which outlet opening is selectively closed off by a closure element, and the apparatus having (i) a first terminal and a second terminal for providing a triggering voltage for triggering the safety device, (ii) a firing device configured to fire in response to a firing current, in order to open the closure element, (iii) an electrical coil configured to actuate, in response to a coil current, the closure device for controlling the gas flow through the outlet opening, the coil being connected in series with the firing device between the first terminal and the second terminal, and (iv) an electrical component having a voltage-dependent resistance and being connected in parallel with the firing device, the method comprising:
- providing the triggering voltage until the firing device has fired; and
- providing an actuation voltage in order to actuate the closure device.

* * * * *